(12) United States Patent
Miller et al.

(10) Patent No.: US 10,781,946 B1
(45) Date of Patent: Sep. 22, 2020

(54) ALL RUBBER LOW SULFUR AND EXTRACTION PED HOSE

(71) Applicant: ContiTech USA, Inc., Fairlawn, OH (US)

(72) Inventors: Lance Miller, Uniontown, OH (US); Andrew J. Speidel, Norfolk, NE (US)

(73) Assignee: ContiTech USA, Inc., Fairlawn, OH (US)

( * ) Notice: Subject to any disclaimer, the term of this patent is extended or adjusted under 35 U.S.C. 154(b) by 47 days.

(21) Appl. No.: 16/387,569

(22) Filed: Apr. 18, 2019

(51) Int. Cl.
*F16L 11/08* (2006.01)
*F16L 11/12* (2006.01)
*B32B 1/08* (2006.01)

(52) U.S. Cl.
CPC .............. *F16L 11/088* (2013.01); *B32B 1/08* (2013.01); *F16L 11/081* (2013.01); *F16L 11/12* (2013.01); *B32B 2307/7242* (2013.01); *B32B 2307/7265* (2013.01); *B32B 2597/00* (2013.01); *C08L 2203/18* (2013.01)

(58) Field of Classification Search
CPC ........ F16L 11/08; F16L 11/081; F16L 11/088; B32B 2307/7265; B32B 2307/7242
USPC .................. 138/123–127, 114, 148
See application file for complete search history.

(56) References Cited

U.S. PATENT DOCUMENTS

| 4,274,549 A | * | 6/1981 | Germain | .............. | B60K 15/035 |
| | | | | | 138/113 |
| 5,084,314 A | * | 1/1992 | Igarashi | ................ | F16L 11/085 |
| | | | | | 138/125 |
| 5,570,711 A | * | 11/1996 | Walsh | ..................... | B32B 25/08 |
| | | | | | 138/137 |
| 5,639,528 A | | 6/1997 | Feit et al. | | |
| 5,679,425 A | | 10/1997 | Plumley | | |
| 5,765,609 A | * | 6/1998 | Dalhart | .................... | B67D 7/42 |
| | | | | | 138/113 |
| 5,782,275 A | | 7/1998 | Hartsell, Jr. et al. | | |
| 5,992,395 A | | 11/1999 | Hartsell, Jr. et al. | | |
| 6,489,420 B1 | | 12/2002 | Duchesne et al. | | |
| 2001/0001395 A1 | * | 5/2001 | Shifman | ............... | F16L 11/081 |
| | | | | | 138/126 |

(Continued)

FOREIGN PATENT DOCUMENTS

EP 1258342 A2 11/2002
EP 1340934 A2 9/2003

(Continued)

OTHER PUBLICATIONS

Mingxin Zhen, "Engineering Material", Central Radio and Television University Press, pp. 226-227, Jan. 2008.

*Primary Examiner* — Patrick F Brinson
(74) *Attorney, Agent, or Firm* — David L. Cate; Gregory J. Adams

(57) ABSTRACT

A hose includes a bisphenol A curable rubber tube layer, an optional nitrile rubber friction layer disposed over the tube layer, a reinforcement layer disposed over the tube layer or optional friction layer, the reinforcement layer comprising braided steel wire, and a cover layer disposed over the reinforcing layer, where the cover layer may comprise chlorinated polyethylene. The tube layer defines a lumen in the hose, and a vapor return line may further be disposed within the lumen of the hose. Hose embodiments of the disclosure may be useful in fueling applications for vehicles using fuels such as gasoline, gasohol, diesel, biodiesel, avgas or jet fuel.

15 Claims, 2 Drawing Sheets

(56) References Cited

U.S. PATENT DOCUMENTS

| | | | |
|---|---|---|---|
| 2004/0134553 A1* | 7/2004 | Ichimura | F16L 39/02 138/114 |
| 2005/0011571 A1* | 1/2005 | Wilson | B32B 25/08 138/126 |
| 2008/0072984 A1* | 3/2008 | Branch | B32B 27/34 138/124 |
| 2008/0185063 A1 | 8/2008 | Bieszczad et al. | |
| 2015/0198269 A1* | 7/2015 | DiMascio | F16L 11/10 138/127 |
| 2016/0168767 A1* | 6/2016 | Bader | D04B 1/22 442/60 |

FOREIGN PATENT DOCUMENTS

| | | | |
|---|---|---|---|
| WO | 9961227 A1 | 12/1999 | |
| WO | 0200741 A1 | 1/2002 | |

\* cited by examiner

ALL RUBBER LOW SULFUR AND EXTRACTION PED HOSE

FIELD

The disclosure generally relates is hoses suitable for use in the conveyance of fuels such as gasoline, gasohol, diesel, biodiesel, avgas and jet fuel. These hoses are of particular value for use in conjunction with both conventional and vapor recovery fuel dispensing pumps, such as those used for fueling automobiles, trucks, agricultural equipment, locomotives, aircraft, and the like.

BACKGROUND

This section provides background information to facilitate a better understanding of the various aspects of the disclosure. It should be understood that the statements in this section of this document are to be read in this light, and not as admissions of prior art.

A wide array of performance demands are put on the hoses used on fuel pumps, such as those used at gasoline filling stations, truck stops and airports. For instance, such hoses must be strong, durable, flexible, resistant to organic solvents, resistant to volumetric expansion, offer a long service life, and have low permeability to gasoline, gasohol, diesel, biodiesel, avgas and/or jet fuel. Such fuel hoses must also be capable of being coupled to fittings in a manner that prevents fuel from escaping.

There is currently a demand to further improve such hoses to make them even less permeable to fuels, such as gasoline, gasohol (gasoline which contains a significant amount of ethyl alcohol such as 10 percent or more), diesel, biodiesel, avgas and/or jet fuel. This is because the fuel which migrates through the hose ultimately evaporates and escapes into the atmosphere, which is an environmental concerns. Accordingly, such hoses must comply with various standards imposed by the Environmental Protection Agency, the California Air Resources Board, and a host of other governmental authorities. However, improving the resistance of such hoses to permeation by fuel and particularly gasohol without compromising the needed physical and chemical characteristics of the hose has proven to be an extremely difficult task.

Today there is also a strong demand for hoses that do not include sulfur or organic compounds which can be extracted by fuel thereby increasing the fuel's level of sulfur and other extractable organic compounds. This is particularly true in China where hoses which do not appreciably increase the levels of sulfur and undesirable organic compounds in fuels conveyed there through is mandated. For example, certain areas of China now require that DB11/238 be met for gasoline and DB11/239 be met for diesel fuel, which calls for a sulfur content that is less than 10 ppm (or 10 mg/kg), unwashed gum content of less than 30 mg/100 ml, and solvent washed gum content that is less than 5 mg/100 ml. Throughout the world, more stringent standards which have proven to be extremely elusive to meet have continually lowered the maximum level of sulfur which is allowed to migrate into the fuel. Additionally, stricter standards are in place for hoses to meet with regard to unwashed and washed gum content testing. Fuel having a low sulfur content and a low extractable gum content is an important aspect of meeting stricter standards throughout the world and lowering total vehicle emissions.

The development of fuel hoses, which do not increase the level of sulfur and/or gum in fuels conveyed there through, has proven to be elusive. For example, dispensing fuels through most existing commercial hoses results in levels of sulfur in fuel that are unacceptably high, such as in the range of 50 to 100 ppm of sulfur, and 300 to over 1000 mg/100 ml unwashed gum extractables after being used subsequent to a period of inactivity, such as not being used overnight.

It is difficult to meet today's standards because fuel hoses must possess an array of physical and chemical characteristics that cannot be compromised. For instance, such fuel hoses should be capable of performing over a long service life without deterioration by the elements and without having extractables dissolved by the fuel. Such hoses must also be capable of providing adequate flexibility to perform in a desired manner, and must be resistant to expansion during service. As previously explained, such fuel hoses must also exhibit a low degree of permeability to fuels and must also be capable of being coupled to fittings in a permanent and reliable manner.

Thus, there is an ongoing need in the industry for a hose having this critical combination of physical and chemical characteristics, such need met, at least in part, with embodiments according to the following disclosure.

SUMMARY

This section provides a general summary of the disclosure, and is not a necessarily a comprehensive disclosure of its full scope or all of its features.

In a first aspect of the disclosure, a hose, such as a hose or fuel hose, is provided which offers the advantage of not attributing significantly to the level of sulfur or extractable organic compounds to fuels conveyed there through. Additionally, such hoses can accomplish this important objective without compromising other important chemical and physical characteristics of the hose. More specifically, the hoses of the disclosure achieve these objectives without compromising resistance to permeation by fuels, strength, durability, flexibility, and resistance to volumetric expansion. In some aspects, the hoses of according to the disclosure offer resistance to permeation by gasoline and gasohol of equal to or less than about 100 grams/m$^2$/day, or even from about 20 to about 80 grams/m$^2$/day. These hoses also offer a long service life and are capable of being coupled to fittings in a manner that prevents fuel from escaping.

In some cases, the hoses of the disclosure do not significantly attribute to the gum or sulfur content of fuel conveyed there through which helps with the dispensing of "clean" fuel. Furthermore, this hose offers high compatibility with fuels having varying amounts of ethanol (diesel fuels, flex-fuels, biofuels, etc.) and gasoline.

In some embodiments of the disclosure, a hose is provided which includes a tube layer, where the tube layer is comprised of a non-sulfur curable rubber, an optional friction layer which is situated over the tube layer when used, where the optional friction layer may comprise one of a nitrile rubber, a fluoroelastomer, epichlorohydrin, a hydrogenated nitrile rubber, a carboxylated nitrile rubber, or a blend thereof, a reinforcement layer disposed over the tube layer and/or optional friction layer, and a cover layer which is situated over the reinforcing layer. The reinforcement layer in some cases is comprised of braided steel wire providing a wire pack coverage that is within the range of about 30 percent to about 65 percent. The cover layer situated over the reinforcing layer may comprise one of a chlorinated polyethylene, polychloroprene, a nitrile rubber/PVC rubber blend, a nitrile rubber, epicholorhydrin rubber, chlorosulfonated polyethylene, hydrogenated nitrile rubber, fluoroelastomer, styrene-butadiene rubber, or any combination thereof. In some aspects of the disclosure, fuel is contained within an inner volume defined by the tube layer, or otherwise open space, or conduit therein, for transferring fuel through the hose.

In another aspect of the disclosure, a vapor assist hose having a lumen is provided, which includes a tube layer, where the tube layer is comprised of a non-sulfur curable rubber, and an optional friction layer disposed over the tube layer, where the optional friction layer may comprise one or more of a nitrile rubber, a fluoroelastomer, epichlorohydrin, a hydrogenated nitrile rubber, a carboxylated nitrile rubber, or a blend thereof. A reinforcement layer is disposed over the tube layer and/or optional friction layer, a cover layer disposed over the reinforcing layer, and a vapor return line disposed within the lumen of the hose, where the vapor return line is comprised of a polymeric material which is essentially void of sulfur and extractables. The reinforcement layer may, in some cases, comprise braided steel wire providing a wire pack coverage which is within the range of about 30 percent to about 65 percent. The cover layer may comprise one or more of chlorinated polyethylene, polychloroprene, a nitrile rubber/PVC rubber blend, a nitrile rubber, epicholorhydrin rubber, chlorosulfonated polyethylene, hydrogenated nitrile rubber, fluoroelastomer, styrene-butadiene rubber. In some aspects of the disclosure, fuel is contained within an inner volume defined by the tube layer.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
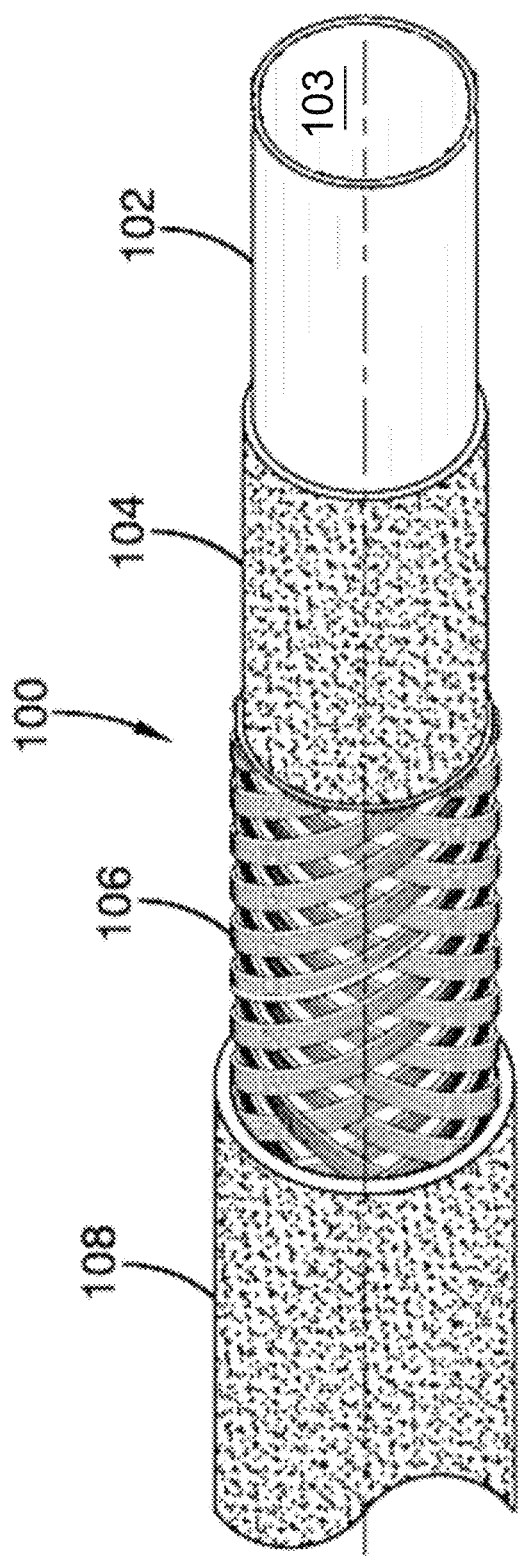
FIG. 1 is a cut-away perspective view of a hose which illustrates the various layers therein, according to some embodiments of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range or dimension listed or described as being useful, suitable, or the like, is intended that any and every concentration or amount or dimension within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

FIG. 1 illustrates some hose embodiments of the disclosure in a cut-away perspective view. Hose 100 typically has an inside diameter which is within the range of about 0.6 inch (15 mm) to about 4 inches (about 100 mm) and has an outside diameter of about 0.9 inch (23 mm) to about 6 inches (about 150 mm). For instance, the hose 100 may have an inside diameter of ⅝ inch (16 mm), ¾ inch (19 mm), ⅞ inch (22 mm), 1 inch (25 mm), 2 inches (50 mm), or even up to about 4 inches (about 100 mm), or any value between these inner diameters. In an embodiment, the hose can have in inside diameter of about 0.720 inch to about 0.780 inch (18 mm to 20 mm) and an outside diameter of about 1.115 inch to about 1.165 inch (28 mm to 30 mm), while in another embodiment, the hose has in inside diameter of about 0.860 inch to about 0.910 inch (22 mm to 23 mm) and an outside diameter of about 1.25 inch to about 1.30 inch (31 mm to 33 mm). The hose 100 has a tube layer (core layer) 102, relative to the radial direction of the hose and the longitudinal hose axis. The tube layer 102 is the innermost layer of the hose and in accordance with embodiments of the disclosure, is formed from a non-sulfur cured rubber. This tubular inner core layer 102 may be referred to in the art as simply the "tube," or as the "core".

Tube layer 102 is comprised of a non-sulfur cured rubber and is typically about 0.005 inches (0.13 mm) to about 0.040 inches (102 mm) in wall thickness. The tube layer wall thickness is more typically from about 0.010 inches (0.03 mm) to about 0.035 inches (0.89 mm). For instance, the tube layer can have a wall thickness which is in the range from about 0.015 inches (0.38 mm) to about 0.035 inches (0.89 mm), or within the range of about 0.020 inches (0.51 mm) to about 0.030 inches (0.76 mm). The non-sulfur cured rubber is typically a bisphenol A curable rubber, such as, but not limited to, nitrile rubber, hydrogenated nitrile rubber, epichlorohydrin rubber, fluoroelastomer rubber, perfluoroelastomer rubber, thermoplastic elastomer, and the like. In contrast with a typical veneer designs for the hoses, such as those disclosed in US Pat. App. Pub. No. 2018/0264771, the disclosure of which is incorporated herein in its entirety by reference, tube layer 102 is not a thermoplastic veneer or barrier type structure, but rather tube layer 102 is very flexible, even at cold temperatures, thus overcoming the possibility of fatigue failures in the field during cold weather and fuel contact. Embodiments according to the disclosure are also unique in that the performance for other required properties are at least equivalent to thermoplastic veneer or barrier type hose constructions.

In some embodiments of the disclosure, fuel is contained within an inner volume 103 defined by the tube layer 102. The inner volume 103 is open space, lumen, or a conduit therein, for containing and/or transferring fuel through the hose. Fuels, such as gasoline, gasohol, diesel, biodiesel, avgas, jet fuel, and like, are typically the types of fuel contained and/or transferred by inner volume 103.

Tube layer 102 formed from the non-sulfur cured rubber minimizes sulfur contamination, as well as avoids the use high amounts of plasticizers, thereby minimizing gum extractions. Generally, the non-sulfur cured rubber has low glass transition temperature to prevent cracking at low temperature, as well. The non-sulfur curable rubber is capable of easy extrusion despite being rich in rubber content and having no/low plasticizer concentration. Also, the mixing of the rubber is done in such a way to prevent oil or sulfur contamination during production.

The non-sulfur cured rubber mixtures used to form tube layer 102 may also contain various additives in conventional or suitable amounts known to persons having ordinary skill in the art. Such additives may include, but are not limited to, retardants to prevent an unduly quick cure, antioxidants, adhesion promoters, processing aids, reinforcing agents and fillers, such as carbon black, silica, other mineral fillers, lignin, and the like.

In some aspects of the disclosure, an optional friction layer 104 is disposed over and outwardly from tube layer 102 in the hose 100 of this disclosure. The optional friction layer may typically be from about 0.020 inches (0.51 mm) to about 0.120 inches (3.0 mm) thick, is more typically from about 0.040 inches (1.02 mm) to about 0.100 inches (2.54 mm) thick, and in some aspects, will be from about 0.060 inches (1.52 mm) to about 0.080 inches (2.03 mm) in thickness. When used, friction layer 104 will typically be in direct contact with layer 102. The friction layer 104 may be comprised of a peroxide or bisphenol A cured rubber. In some embodiments of the disclosure, a nitrile rubber having a bound acrylonitrile monomer content which is within the range of about 16 percent to about 50 percent, or within the range of about 25 weight percent to about 50 weight percent, can be used. In another embodiment, the optional friction layer can be comprised of a fluoroelastomer, epichlorohydrin, nitrile, hydrogenated nitrile rubber, carboxylated nitrile rubber, or blends thereof.

The nitrile rubber employed in the optional friction layer 104 of hoses, or other layers as well, in accordance with the disclosure, may also contain various additives in conventional or suitable amounts known to persons having ordinary skill in the art. Such additives may include, and are not limited to, retardants to prevent an unduly quick cure, antioxidants, adhesion promoters, processing aids, reinforcing agents and fillers, such as carbon black, silica, other mineral fillers, lignin, and the like. Reinforcing fillers are typically utilized at a level which is within the range of about 50 parts per hundred parts of resin (phr) to about 150 phr.

Figure 2:
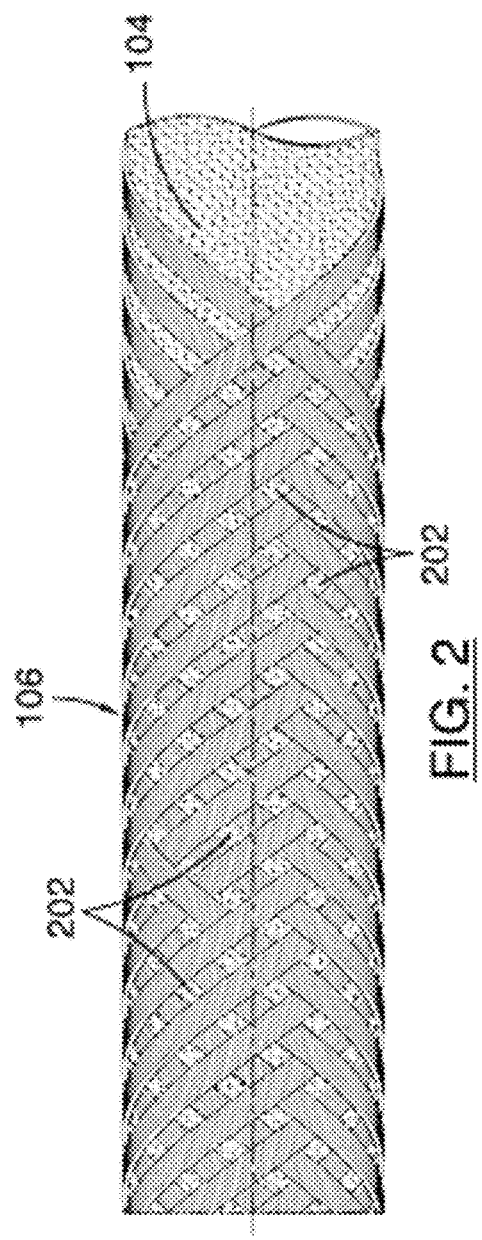
FIG. 2 illustrates reinforcing layers in direct contact with an optional friction layer as used in some hoses according to the disclosure, in a cut-away perspective view; and, FIG. 3 is a cut-away perspective view of a hose having a vapor assist hose disposed therein, according to some embodiments of the disclosure.

Hoses according to the disclosure further include a reinforcing layer 106, which is situated over and outwardly from layer 102, or optional layer 104 when incorporated, which is depicted in FIG. 2 in further detail. In some embodiments, reinforcing layer 106 is formed of a reinforcing material in a braided, spiral, knitted reinforcement or wrapped construction. A braided reinforcing layer 106 is depicted in FIG. 2. The reinforcing material may be any suitable material for reinforcing the hose, such as, but not limited to, steel wire (such as stainless steel wire, plated steel wire, plain steel wire, and the like), or yarns (or fabrics woven from yarns) such as those based upon woven nylon fabric composite, rayon, polyester, aramid, polyamide, cotton, and the like.

In preparing a braided reinforcing layer, in some aspects, the inner tube is extruded onto a suitable mandrel and then passed through the braiding head. Here, a number of single-end packages are arranged and rotate around the tube, to give the braiding pattern of winding and interlacing as required. Where preparing a spiral reinforcing layer, yarns or wires are wound on helically, with individual yarns or wires being laid together in the neutral angle of wrap, providing cover of the yarns. In order to prevent twisting or curving, an even number of layers, with alternate direction of lay, is applied, with a layer of rubber between each layer of reinforcement. Wrapped reinforcement layer hoses are built on a large lathe or building table, usually with a mandrel. The inner rubber lining is firstly wrapped onto the mandrel, and then the fabric reinforcement layers wound on. The fabric may be cut into relatively narrow widths, so that it can be spiraled on, or can be bias cut into wider sections, so that it can be wrapped directly onto the inner tube. Both of these methods allow the warp to lie at approximately the neutral angle. Hoses with knitted reinforcement layers are frequently used for hoses requiring changes in bore size, and/or with many bends and curves. When preparing such hoses, the inner tube is extruded and the reinforcement fabric is then knitted directly onto it, in a similar manner to the braiding system.

In some aspects of the disclosure, the reinforcing layer 106 is formed by braiding steel wires, which in some cases are brass plated wires. For instance, the reinforcing layer 106 can be manufactured utilizing a braiding machine having 16 to 36 carriers (bobbins of wire), with 2 to 12 wire ends of about 0.006 to about 0.015 inch (0.15 mm to 0.38 mm) gage. In one embodiment, the reinforcing layer 106 is manufactured utilizing a braiding machine having 24 carriers (bobbins of wire) with wire ends of 0.012 inch (0.3 mm) gage wire. In some aspects, the braided steel wire used in the reinforcing layer 106 has a wire pack coverage, which is within the range of about 30 percent to about 65 percent. In other words, the wires of the reinforcement layer cover from about 30 percent to about 65 percent of the surface area of tube layer 102, or optional friction layer 104, with the remaining 35 percent to 70 percent of the underlying layer being exposed through windows 202 in the braid pattern. While the braided steel wire will typically have a wire pack coverage, which is within the range of about 30 percent to about 65 percent and, in some aspects, the wire pack coverage is within the range of about 40 percent to about 60 percent. The braided steel wire, may in some embodiments, have a wire pack coverage which is within the range of about 50 percent to about 55 percent. In one specific embodiment of the disclosure, to attain improved kink resistance, the reinforcement layer is comprised of multiple spiral laid wires of different sizes in conjunction with a textile braided construction.

Referring again to FIG. 1, a cover layer 108 is positional outwardly from the reinforcement layer 106. The cover layer 108 in some embodiments, is from about 0.060 inches (1.5 mm) to about 0.120 inches (3.0 mm), from about 0.070 inches (1.5 mm) to about 0.110 inches (2.8 mm) in thickness, and in some instances, about 0.080 inches (1.8 mm) to about 0.100 inches (2.5 mm) in thickness. In some aspects, the cover layer 108 can be comprised of a chlorinated polyethylene, which typically has a chlorine content within the range of about 30 percent to about 36 percent. The cover layer 108 can also optionally be comprised of polychloroprene rubber, nitrile/PVC rubber, nitrile rubber, epichlorhydrin rubber, chlorosulfonated polyethylene, hydrogenated nitrile rubber, fluoroelastomer, styrene-butadiene rubber, or blends thereof. In some aspects, the chlorinated polyethylene has a chlorine content which is within the range of about 34 percent to about 36 percent.

Figure 3:
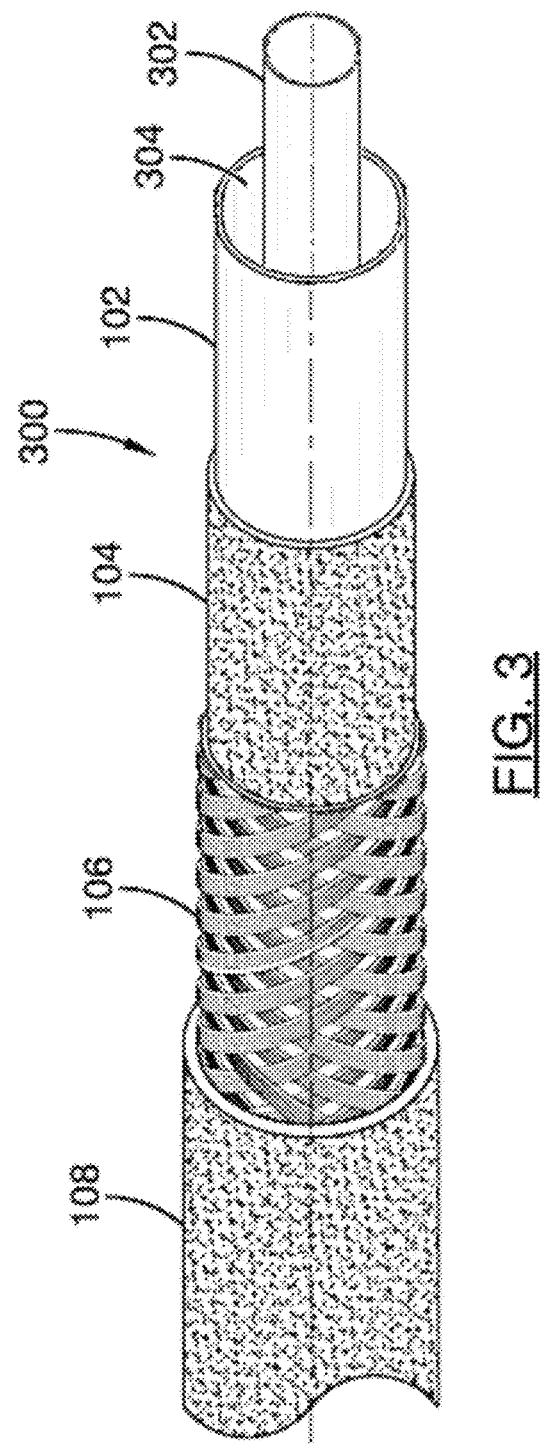

In some embodiments of the disclosure, the hose is a vapor assist hose (otherwise known as a 'vapor recovery hose') as illustrated in FIG. 3. Hose 300 includes a vapor return line 302 situated in the lumen 304 of the hose, where the lumen 304 is defined within tube layer 102, as depicted in FIG. 3. The vapor assist hose may be terminated by any suitable fitting, such as, for example, an internally expanded fitting coupled on the hose surrounding vapor return line 302, while the vapor return line 302 is coupled to a push on fitting. Lumen 304 may also serve as an inner volume, open space, or conduit, for containing and/or transferring fuel through the hose.

Vapor return line 302 is comprised of a polymeric material which does not contain appreciable levels of sulfur, or gum, which can migrate into fuel which flows through the hose. Furthermore, the vapor return line 302 is comprised of a material, which provides it with all of the physical and chemical attributes that are required for the vapor return line in such a hose. For instance, the material should have an ultimate tensile strength of at least 2000 psi about (14 MPa), at least about 4000 psi (28 MPa), and in some cases, at least about 5000 psi (35 MPa). The polymeric material used in making the vapor return line 302 will also typically have a tensile strength at 5% elongation which is within the range of about 500 psi (3.4 MPa) to about 5000 psi (34 MPa), within the range of about 1000 psi (7 MPa) to about 4000 psi (28 MPa), and in some instances, within the range of about 1500 psi (10 MPa) to about 3500 psi (24 MPa). The polymeric material used in making the vapor return line 302 will also typically have a tensile strength at 10% elongation which is within the range of about 1000 psi (7 MPa) to about 5000 psi (34 MPa), within the range of about 1500 psi (10 MPa) to about 4000 psi 28 MPa), and in some cases, within the range of about 2000 psi (14 MPa) to about 3600 psi (25 MPa). The polymeric material used in making vapor return line 302 will also typically have a tensile strength at 50% elongation which is within the range of about 1500 psi (10 MPa) to about 5000 psi (34 MPa), within the range of about 1500 psi (10 MPa) to about 4500 psi (31 MPa), or even within the range of about 1500 psi (10 MPa) to about 4000 psi (28 MPa). In some aspects, the vapor return line 302 is comprised of a material, which allows hose 300 to pass the EN 1360 flex test, after 50,000 cycles using Fuel C.

Vapor return line 302 may be made of any suitable material, such as, but not limited to, polyamides (i.e. nylon, and the like) which is plasticized with a non-migrating plasticizer, or fluoropolymers, and the materials are those which are void of sulfur and gums that can migrate into fuel which flows through the hose. In some embodiments, the nylon can be impact modified nylon, such as impact modified Nylon 6, having a melting point which is within the range of about 210° C. to about 230° C., an ultimate tensile strength within the range of about 10 MPa to about 50 MPa and will typically have a flexural modulus within the range of about 200 MPa to about 1200 MPa. Such impact modified nylon will also have characteristics that allow it to have high impact strength at low temperatures, high flexibility, and low density. Some representative examples of fluoropolymers that can be used in making the vapor return line 302 include polymers of tetrafluoroethylene, hexafluoropropylene, vinylidene difluoride, fluorinated ethylene propylene, ethylene tetrafluoroethylene, perfluorovinyl ether tetrafluoroethylene, ethylene-tetrafluoroethylene, polyvinylidene fluoride and terpolymers of tetrafluoroethylene, hexafluoropropylene, and vinylidene fluoride. Such fluoropolymers typically have a melting point within the range of about 100° C. to about 310° C., an ultimate tensile strength within the range of about 20 MPa to about 30 MPa, and will typically have a flexural modulus within the range of about 32 MPa to about 530 MPa. The fluoropolymers will more typically have a melting point in the range of about 115° C. to about 225° C. In some embodiments of the disclosure, a non-migrating plasticizer or impact modifier can be included in the polymeric composition used in making the vapor return line to provide a higher level of flexibility and toughness. The vapor return line can be comprised of a single layer or can be comprised of one or more coextruded layers of various combinations of polyamides and/or fluoropolymers.

In some aspects, hose embodiments according to the disclosure are capable of meeting HG/T 3037, UL330, EN 1360, and EN 13483 testing standards (incorporated herein by reference), and provide a sulfur extraction level of less than 10 ppm, an unwashed gum extraction value of less than 30 mg/100 ml, a washed gum extraction value of less than 5 mg/100 ml, and a permeation rate equal to or less than about 100 grams/m$^2$/day, or even from about 20 to about 80 grams/m$^2$/day, which provides a hose essentially void of sulfur and extractables. In some other aspects, hose embodiments according to the disclosure are capable meeting aviation fuel hose standards EI 1529 and EN ISO 1825, incorporated herein by reference. Furthermore, hose embodiments of the disclosure may be useful in fueling applications for vehicles using fuels such as gasoline, gasohol, diesel, biodiesel, avgas or jet fuel.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A hose comprising:
   (a) a tube layer, wherein the tube layer comprises a bisphenol A curable rubber;
   (b) a reinforcement layer disposed outwardly from the tube layer; and,
   (c) a cover layer disposed over the reinforcing layer; and, wherein the tube layer defines a lumen, and wherein the hose further comprises a vapor return line disposed within the lumen of the hose.

2. The hose as specified in claim 1 wherein the reinforcement layer comprises braided steel wire, and wherein the braided steel wire has a wire pack coverage which is within the range of about 50 percent to about 55 percent.

3. The hose as specified in claim 1 wherein the bisphenol A curable rubber is selected from the group consisting of nitrile rubber, hydrogenated nitrile rubber, epichlorohydrin rubber, fluoroelastomer rubber and perfluoroelastomer rubber.

4. The hose as specified in claim 3 wherein the bisphenol A curable rubber is fluoroelastomer rubber.

5. The hose as specified in claim 1 wherein the cover layer comprises chlorinated polyethylene.

6. The hose as specified in claim 1 wherein a friction layer disposed between the tube layer and the reinforcement layer, and wherein the friction layer comprises nitrile rubber having an acrylonitrile content which is within the range of about 16 weight percent to about 50 weight percent.

7. The hose as specified in claim 1, the hose comprising fuel contained within an inner volume defined by the tube layer, and the hose a having permeation rate of from 20 grams/m$^2$/day to 80 grams/m$^2$/day.

8. A vapor assist hose comprising:
   (a) a tube layer, wherein the tube layer defines a lumen, and wherein the tube layer comprises a bisphenol A curable rubber;
   (b) a reinforcement layer disposed outwardly from the tube layer;
   (d) a cover layer disposed over the reinforcing layer; and,
   (e) a vapor return line disposed within the lumen of the hose, wherein the vapor return line comprises a polymeric material.

9. The vapor assist hose as specified in claim 8 wherein the reinforcement layer comprises braided steel wire, and wherein the braided steel wire has a wire pack coverage which is within the range of about 30 percent to about 65 percent.

10. The vapor assist hose as specified in claim 8 wherein the polymeric material is a fluoropolymer.

11. The hose as specified in claim 8 wherein the bisphenol A curable rubber is selected from the group consisting of nitrile rubber, hydrogenated nitrile rubber, epichlorohydrin rubber, fluoroelastomer rubber and perfluoroelastomer rubber.

12. The hose as specified in claim 11 wherein the bisphenol A curable rubber is fluoroelastomer rubber.

13. The hose as specified in claim 8 wherein the cover layer comprises chlorinated polyethylene.

14. The hose as specified in claim 8 wherein a friction layer disposed between the tube layer and the reinforcement layer, and wherein the friction layer comprises nitrile rubber having an acrylonitrile content which is within the range of about 16 weight percent to about 50 weight percent.

15. The hose as specified in claim 8, the hose comprising fuel contained within an inner volume defined by the tube layer, and the hose a having permeation rate of from 20 grams/m$^2$/day to 80 grams/m$^2$/day.

* * * * *